No. 699,848. Patented May 13, 1902.
C. F. PRESLAR.
SEALING DEVICE FOR TUBULAR WELLS.
(Application filed July 5, 1901.)
(No Model.)
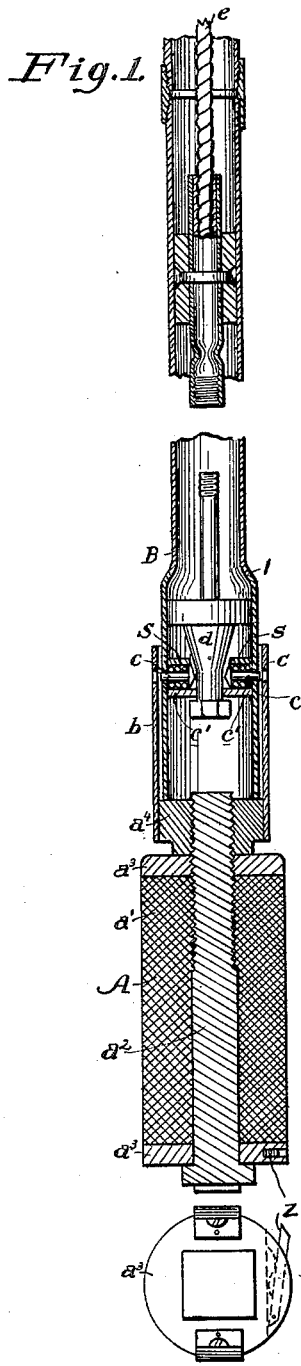
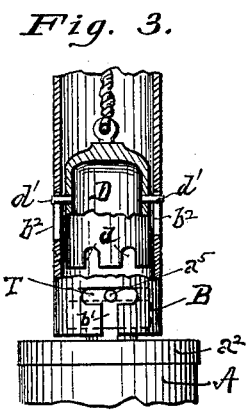
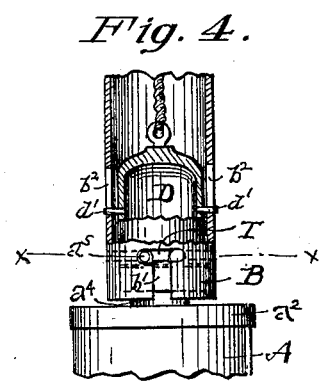
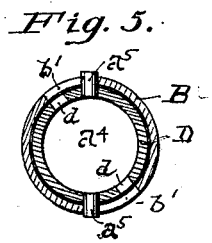
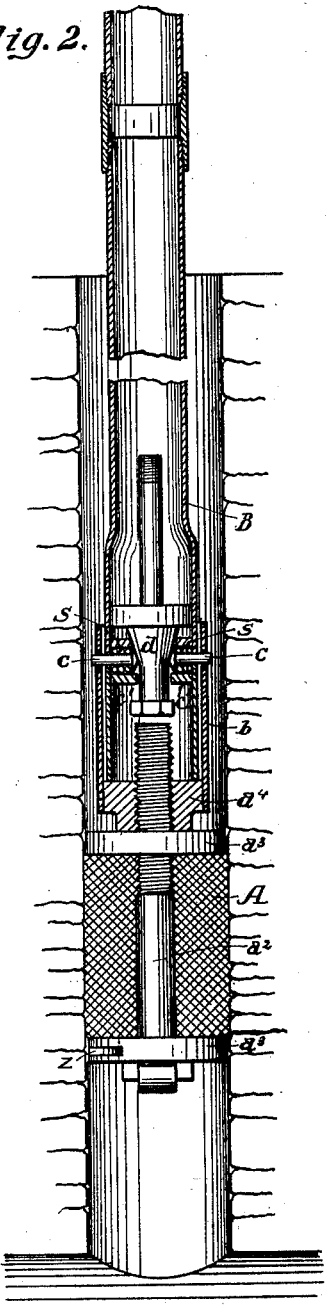
Witnesses.
Walter A. Knight.
Chas. Herbert Jones.
Inventor.
Charles F. Preslar
by L. M. Hosea atty

UNITED STATES PATENT OFFICE.

CHARLES F. PRESLAR, OF CINCINNATI, OHIO, ASSIGNOR TO THE PRESLAR-CRAWLEY MANUFACTURING CO., OF CINCINNATI, OHIO, A CORPORATION OF OHIO.

SEALING DEVICE FOR TUBULAR WELLS.

SPECIFICATION forming part of Letters Patent No. 699,848, dated May 13, 1902.

Application filed July 5, 1901. Serial No. 67,225. (No model.)

*To all whom it may concern:*

Be it known that I, CHARLES F. PRESLAR, a citizen of the United States, residing at Cincinnati, in the county of Hamilton and State of Ohio, have invented new and useful Improvements in Sealing Devices for Tubular Wells, of which the following is a specification.

My invention relates to sealing devices for use in "driven" or "drilled" wells, its object being to provide a seal and suitable apparatus for placing in position or removing the same, as desired. In another pending application I have shown and described an apparatus for this purpose in which two sets of piping are used, one operating within the other, to lower the seal to its place and expand it against the walls of the well. In my present invention I employ but one set of tubing to perform both functions and otherwise simplify the means employed to place, expand, or remove the seal.

To this end my invention consists in a cylindrical seal radially expansible by longitudinal compression, (and contractible by the opposite process,) combined with a suspending-tube having also the function of operating a compressing element, and means of attaching the one to and detaching it from the other at will and of operating the seal in place.

My invention is embodied in mechanism illustrated in the accompanying drawings, in which—

Figure 1 is a sectional elevation of the apparatus with the connector shown detached; Fig. 2, a similar sectional elevation showing the seal expanded and the connector shown attached. Figs. 3, 4, and 5 are detail views illustrating modified forms of apparatus for attaining the same substantial results, in which the engagement of the suspending-pipe is made direct with the rotating compressor of the seal by an interior lock, Figs. 3 and 4 showing the parts in disengaged and engaged positions, respectively, and Fig. 5 being a horizontal cross-section of the parts engaged on the line $x$ $x$ of Fig. 4.

Referring now to the drawings, A designates an expansible plug or "seal," and B a pipe for carrying the same to its position and expanding it in place or by a reversal of operation removing it.

The seal is a cylindrical plug $a'$, of rubber, set upon an axial spindle $a^2$, whose upper end is threaded, held between opposite end washers $a^3$ $a^3$ and compressed by nut $a^4$, threaded upon the spindle, which nut we may here call the "compressor." The compressor moves easily upon its threaded stem, so that a slight frictional resistance of the plug in rotation is sufficient to enable the compressor to travel down the spindle by its own rotation and compress the plug longitudinally, thereby expanding it radially into contact with the well or aperture in which it is seated. To increase the frictional resistance of the plug in the first instance, one or more pivoted dogs $z$ may be arranged in the bottom washer of the plug, as shown in Figs. 1 and 2, to move outward and engage the roughnesses of the wall, or any similar devices may be used.

The compressor in the construction first shown is provided with a cylindrical flange $b$, extending upward, within which the terminal section of the tube B enters, and to which it is upon occasion connected by radial pins $c$ $c$, seated in suitable socket-pieces $c'$ at the inner side of the tube. The pins are normally held inward out of engagement by springs $s$, but are forced outward by the action of a conical plunger $d$, carried within the tube B and flange $b$, thus connecting them, while the raising of the plunger releases the pins and allows them to be withdrawn inward out of engagement with the flange $b$ by the action of the springs $s$.

The mode of operation is as follows: To attach the seal to the terminal of pipe B, the latter is dropped down within the upper flange $b$ of the compressor $a^4$, the plunger $d$ being held in its elevated position. The plunger being lowered between the inner ends of pins $c$ they are forced apart, connecting the tube B and the compressor, as indicated. Thus connected the seal is lowered to the required depth. Upon rotating the tube B the friction devices $z$ engage the wall of the well (shown in Fig. 2) and prevent the seal A from rotating, while the continued rotation of the tube carries the compressor $a^4$ down upon its spindle $a^2$ against the washer $a^3$ of the rubber cylinder $a$, which being compressed longitudinally expands radially and seats against the surrounding walls of the well. When thus seated, the plunger $d$ is raised up, the pins recede and disconnect the tube B from the compressor-flange, leaving the seal in place.

The modified construction shown in Figs. 3, 4, and 5 introduces no new principle. In this case the pins $c$ are replaced by projections $a^5$ at diametrically opposite sides of the compressor $a^4$. The lower end of the tube B is provided correspondingly with T-shaped slots $b'$, which enable the tube to slip down over the pins into one end of the cross-slot T. There is provided a lock consisting of an inverted cup D, with recesses $d$ in its lower edge spaced apart the limit of movement of the pins $a^5$ in the cross-slot, which when the pin is at either end of the slot drops down and holds it there in the position indicated in Figs. 4 and 5. The lock may be held in its elevated position by a rope extending to the top of the pipe and is only dropped to lock the pins $a^5$ in relation to the tube B, so that the compressor may be suspended and the tube B held ready to rotate the compressor. The lock is made at one or the other side, so as to be ready to rotate the compressor in either desired direction by direct engagement of the tube B therewith.

I claim as my invention and desire to secure by Letters Patent of the United States—

1. In a sealing apparatus of the character indicated, the combination of an expansible seal, a rotatable compressor operative thereon, and a single tube supporting the seal and also engaging and operating the compressor said tube detachably secured to the compressor and said compressor remaining attached to the seal when the tube is removed.

2. In a sealing apparatus of the character indicated, the combination of a single tube, an independent expansible seal, and a compressor on the seal, adapted to be directly detachably secured to, and operated by the tube, whereby the tube may be removed and the seal and compressor left in place.

3. In a sealing apparatus, the combination of a cylindrical expansible seal having a threaded central stem, and a rotating compressor operative thereon, a suspending-tube adapted to be detachably and rotatively connected to said compressor, and expansible and contractible means for connecting or disconnecting the same at will.

4. In a sealing apparatus of the character indicated, the combination of the expansible seal, and its rotating compressor having an upward tubular flange; a suspending-tube adapted to drop down within the flange of the compressor; radial pins attached to and extending through the suspending-tube; a conical or wedge-shaped "plunger" carried within the suspending-tube adapted to be dropped down between the inner ends of the radial pins and force them outward through corresponding apertures of the compressor-flange; and springs seated upon the pins and acting normally to withdraw them inward and disconnect the tube and flange when the plunger is withdrawn upward, substantially as set forth.

5. In a sealing apparatus of the character indicated, the combination of a seal having a threaded stem; a compressor on said stem; a tube; and radially-operating devices between the tube and compressor whereby the seal is detachably secured and the expander operated.

In testimony whereof I have hereunto set my hand in presence of two subscribing witnesses.

CHARLES F. PRESLAR.

Witnesses:
WALTER A. KNIGHT,
LLOYD T. BRUNSON.